Aug. 11, 1970  W. E. HARRELL  3,523,465
ADJUSTABLE CAM SHAFTS
Filed Oct. 31, 1968  2 Sheets-Sheet 1

INVENTOR
WILLIAM E. HARRELL

BY
ATTORNEYS

INVENTOR
WILLIAM E. HARRELL

BY

ATTORNEYS

3,523,465
ADJUSTABLE CAM SHAFTS
William Emory Harrell, c/o General Delivery,
Clyattville, Ga. 31601
Filed Oct. 31, 1968, Ser. No. 772,146
Int. Cl. F01l *13/00;* F16h *53/00*
U.S. Cl. 74—568                                                              3 Claims

ABSTRACT OF THE DISCLOSURE

The adjustable cam shaft for internal combustion engines includes an elongated tubular hub having a timing spur gear secured to one end thereof, the hub having a series of lobe inserts radially slidably mounted therein for operating the usual valve mechanism of the engine cylinders respectively. An axially slidable cam shaft is rotatably mounted in the link terminating short of the spur gear, the shaft having a threaded reduced inner end engaging a thrust nut rotatably journaled in an enlarged bore in the adjacent end of the hub, with means for locking the nut in adjusted rotational position with respect to the gears. The cam shaft has a series of inclined recesses therein receiving the inner ends of the lobe inserts respectively and provided with T-splines engaging T-slots in the inner ends of the lobe inserts which are correspondingly inclined, whereby axial adjustment of the cam shaft in the hub will cause simultaneous radial adjustment of the lobe inserts in the hub.

DESCRIPTION OF INVENTION

This invention relates to adjustable cam shafts used in connection with the valve operating means for internal combustion engines or the like, and more particularly to improvements in means for varying the valve timing of such engines, which timing of the intake and exhaust valves of an internal combustion engine has a direct bearing on the efficiency of the engine at operating speeds thereof.

The principal object of the invention is to provide an adjustable cam shaft for internal combustion engines comprising an elongated tubular hub having a timing spur gear secured to one end thereof, the hub having a series of lobe inserts radially slidably mounted therein for operating the usual valve mechanism of the engine cylinders respectively. An axially slidable cam shaft is rotatably mounted in the hub terminating short of the spur gear, the shaft having a threaded reduced inner end engaging a thrust nut rotatably journaled in an enlarged bore in the adjacent end of the hub, with means for locking the nut in adjusted rotational position with respect to the gear. The cam shaft has a series of inclined recesses therein receiving the inner ends of the lobe inserts respectively and provided with T-splines engaging T-slots in the inner ends of the lobe inserts which are correspondingly inclined whereby axial adjustment of the cam shaft in the hub will cause simultaneous radial adjustment of the lobe inserts in the hub.

Another object of the invention is to provide in a cam shaft as above set forth, locking means including an adjusting plate secured to the outer end of the thrust nut and having a substantially semi-circular slot therein coaxial with said gear, a lock screw passing through said slot and threaded into the web of the gear.

Another object of the invention is the provision of an adjustable cam shaft which is extremely simple and inexpensive to produce and install, which has relatively few moving parts, which is highly efficient in operation, and which is rugged in construction and durable in use.

I will explain the invention with reference to the accompanying drawings which illustrate one practical embodiment thereof to enable others familiar with the art to adopt and use the same, and will summarize in the claims the novel features of construction and novel combinations of parts, for which protection is desired.

Figure 1:
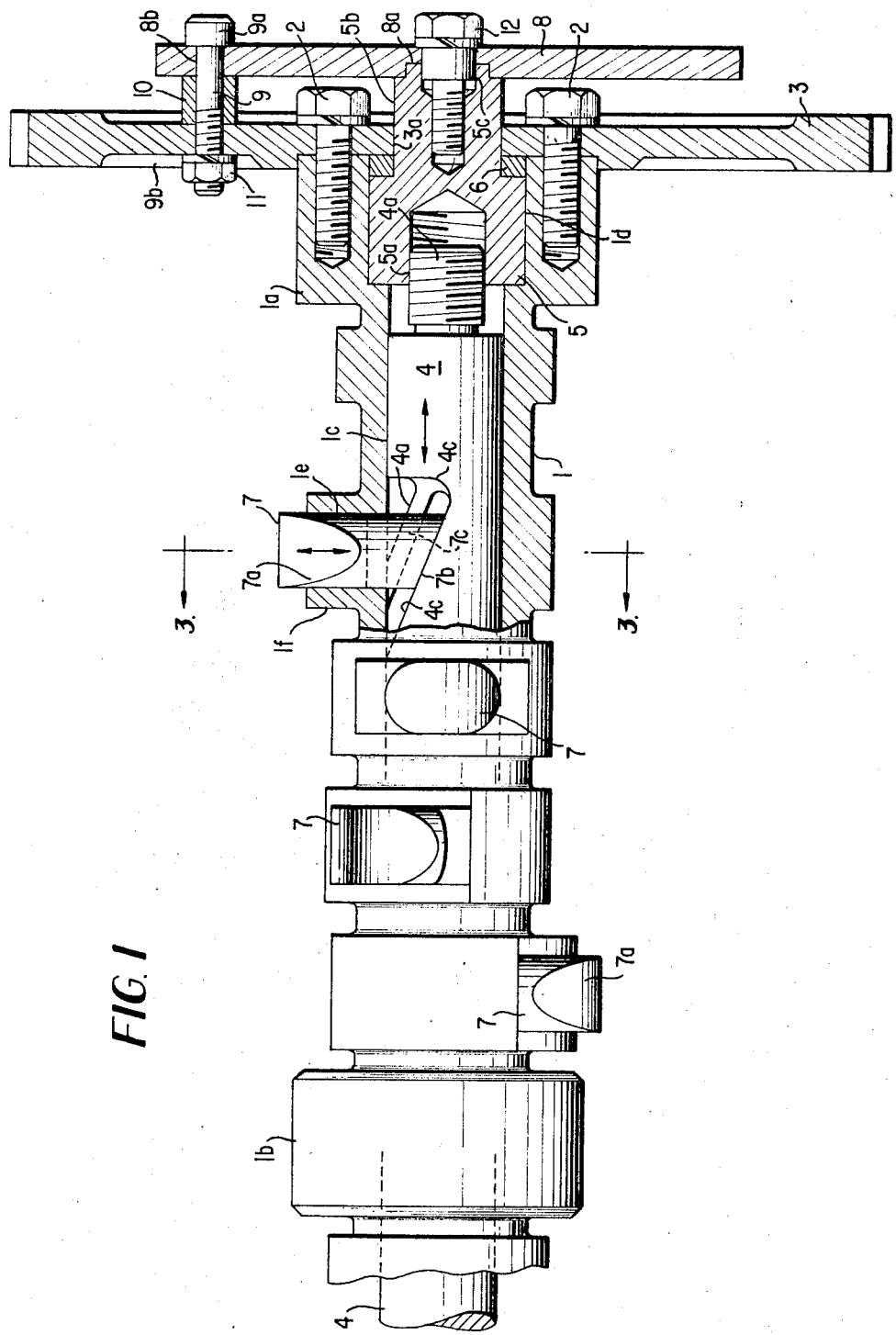
FIG. 1 is a side elevation partly in section through an assembly of a timing spur gear with my novel adjustable cam shaft connected therewith.

As shown in the drawings, my invention consists of a rotatable hub member 1 of substantially tubular form having bearing surfaces 1a, 1b adapted to be mounted in bearings in an engine block (not shown) in any desired manner. The outer end of the hub 1 is bolted by means of bolts 2 to the timing spur gear 3 which drives the cam shaft in any desired manner usually from the drive shaft (not shown) of the engine in any desired manner, the bolts 2 passing through the web of spur gear 3 and into the end of the bearing portion 1a of the hub 1, as shown in FIGS. 1 and 2.

Figure 2:
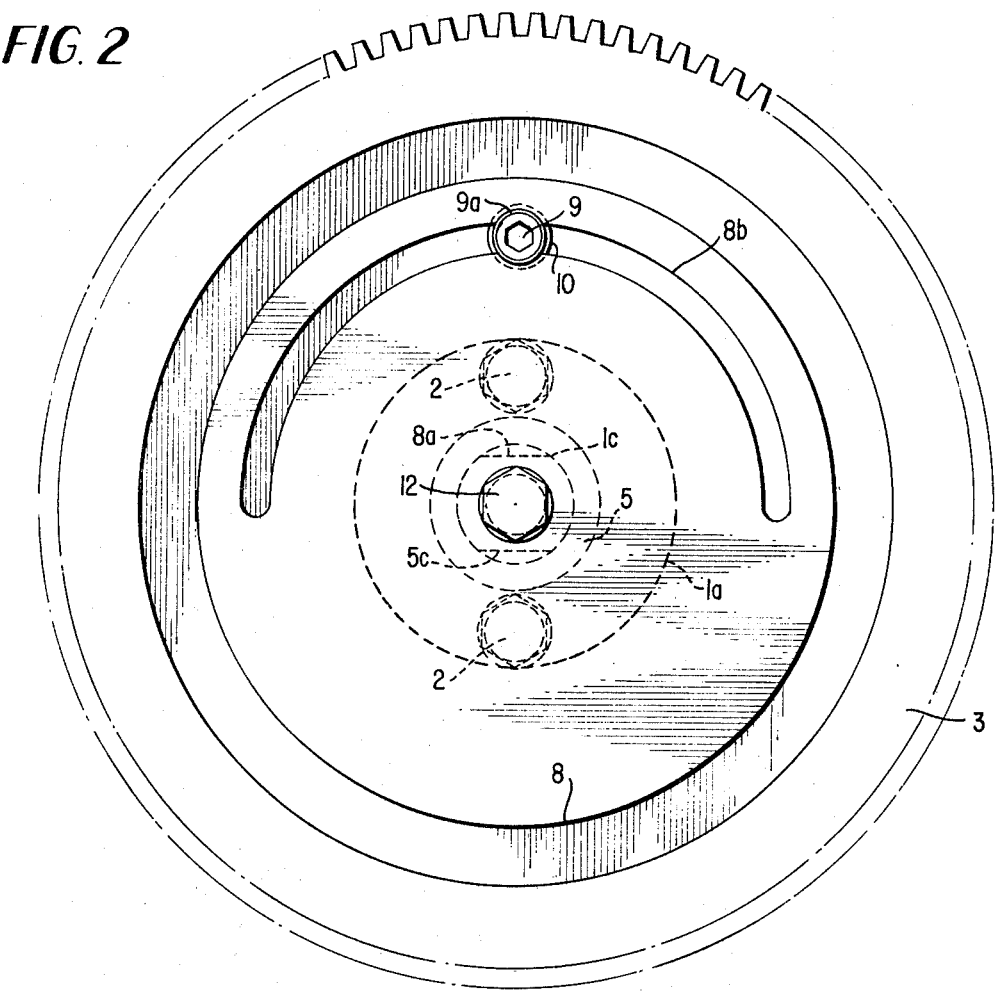
FIG. 2 is an end elevation of FIG. 1 looking at the timing spur gear, and showing my novel adjustment plate and lock screw for radially adjusting the elevation of the lobe inserts which are associated with the cam shaft in the tubular hub.

The hub 1 has a bore 1c extending axially therethrough for the reception of cam shaft 4, the cam shaft 4 being axially slidable in the bore 1c and terminating short of the spur gear 3, as shown in FIG. 1, but having an axial threaded extension 4a at its end adjacent the spur gear 3 which is engaged in the tapped bore 5a of a thrust nut 5, which thrust nut is rotatably mounted in an enlarged portion 1d of the bore 1c as shown in FIG. 1, the outer end of the thrust nut 5 being reduced in diameter as at 5b and passing through an axial hole 3a in the web of the spur gear 3, the outer end of the reduced portion 5b extending beyond the outer face of the web of the spur gear 3 and beyond the outer ends of the heads of the bolts 2, as shown in FIG. 1, for the purpose hereinafter described.

Preferably a thrust washer 6 is interposed between the web of the spur gear 3, the same engaging the shoulder of the thrust nut 5 formed by the reduced portion 5b of the thrust nut, whereby rotation of the thrust nut 5 will cause the shaft 4 to move axially towards or away from the spur gear 3 depending upon the direction of rotation of the nut 5.

Figure 3:
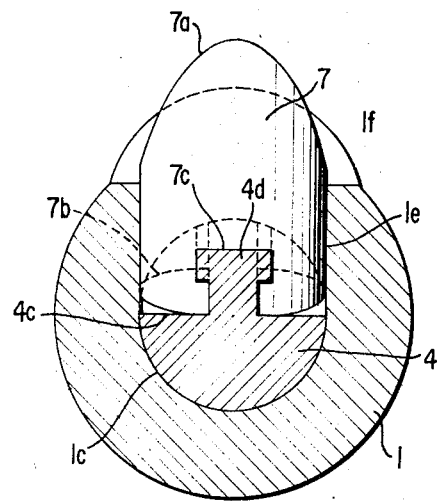
FIG. 3 is an enlarged section on the lines 3—3, FIG. 1.

The hub 5 is provided with one or more radially disposed lobe inserts 7, four being shown in FIG. 1, the same being mounted in radial bores 1e extending through tubular enlargements 1f of the hub 1, as clearly shown in FIGS. 1 and 3, the outer ends of the lobes 7, which project beyond the outer ends of the enlargements 1f, being rounded as at 7a and adapted to engage the valve tappets or the like (not shown) of the internal combustion engine in the usual manner. At each of the lobe inserts 7 are identical except for angularity around the shaft 4, I will describe only one of the mountings for said inserts.

As shown in FIGS. 1 and 3, the inner ends of each lobe insert is beveled or inclined as at 7b with respect to the axis of the shaft 4, the inner end of each of the lobe inserts being similarly beveled on the same angularity with respect to the axis of the shaft 4, and the beveled end 7b is adapted to slidably engage the bottom of a correspondingly angled recess 4c in the wall of the cam shaft 4, the angularities of each of the recesses 4c in the shaft 4 being identical for each of the lobe inserts 7.

Disposed axially of each recess 4c is a centrally disposed T-shaped spline 4d, FIGS. 1 and 3, adapted to engage a correspondingly shaped T-slot 7c in the inner end of each of the inclined faces 7b of the lobe inserts 7, so that as the cam shaft 4 is moved axially with respect to the hub 4, the lobe inserts will be correspondingly moved radially in the bores 1e of the hub a corresponding amount according to the direction of rotation of the thrust nut 5, to thereby adjust the valve timing of the internal combustion engine.

In order to adjust the lobe inserts with respect to the hub, I provide at the outer end of the reduced portion 5b of the thrust nut 5 an adjustment plate 8 as shown in FIGS. 1 and 2, the plate having a non-circular central hole 8a receiving the correspondingly shaped non-circular reduced end 5c of the outer end of the reduced portion 5b of the thrust nut 5 so that the thrust nut 5 may be rotated by and with the rotation of the adjusting plate 8. Plate 8 is secured to the end of the thrust nut 5 by means of a screw 12 or the like.

As shown in FIG. 2 the plate 8 carries a semi-circular slot 8b receiving the shank of a lock bolt 9 having a head 9a on its outer end, the shank of the bolt 9 passing through a spacing washer 10 and threaded as at 9b into a threaded bore in the web of the spur gear 3, the inner end of the bolt 9 carrying a lock nut 11 or the like to secure the plate 8 in adjusted position with respect to the web of the spur gear 3.

By the above construction, upon loosening the lock nut 11 and the bolt 9, the adjusting plate 8 may be rotated with respect to the web of the spur gear 3 to thereby rotate the thrust nut 5 so as to adjust the cam shaft 4 axially with respect to the hub 1, thereby adjusting in or out the lobe inserts 7 in their bores 1e in the enlargements if of the hub 1, to thereby vary the timing of the valve of the internal combustion engine.

After proper adjustment the bolt 9 may again be tightened with respect to the web of the spur gear 3 so as to cause the plate 8 and gear 3 to rotate as a unit in the journals for the bearings 1a, 1b. Obviously an adjustment of the plate 8 will cause radial adjustment of all of the lobe inserts 7 simultaneously, the same moving in or out the same amount according to the direction of rotation of the plate 8.

I do not limit my invention to the exact form shown in the drawings, for obviously changes may be made therein within the scope of the claims.

I claim:

1. An adjustable cam shaft for internal combustion engines comprising a tubular hub; a timing spur gear secured to one end of the hub; said hub having a series of lobe inserts radially slidably mounted therein for operating the usual valve mechanism of the engine cylinders respectively; an axially slidable cam shaft mounted in said hub and terminating short of the spur gear and having a threaded reduced inner end; a thrust nut journaled in an enlarged bore in the adjacent end of the hub and having a threaded bore receiving the threaded end of the cam shaft; means for locking the nut in adjusted rational position with respect to the gear; said cam shaft having a series of inclined recesses therein receiving the inner ends of the lobe inserts respectively and provided with T-splines; and the inner ends of the lobe inserts being correspondingly inclined and provided with T-slots receiving said splines, whereby axial adjustment of the cam shaft in the hub will cause simultaneous radial adjustment of the lobe inserts in the hub.

2. In a cam shaft as set forth in claim 1, said hub having a reduced extension extending through the web of the spur gear; and a thrust washer around said reduced extension interposed between the web and the main body of the thrust nut.

3. In a cam shaft as set forth in claim 2, said locking means comprising an adjusting plate secured to the outer end of the extension; said plate having a substantially semi-circular slot therein coaxial with said gear, a lock screw passing through said slot and threaded into the web of the gear; and a spacing washer on said screw interposed between the plate and web.

References Cited

UNITED STATES PATENTS

| 583,688 | 6/1897 | Lawrence | 74—568 |
|---|---|---|---|
| 733,220 | 7/1903 | Krebs | 123—90 |
| 862,448 | 8/1907 | Cornilleau | 123—90 |
| 2,025,600 | 12/1935 | Loop et al. | 74—568 |
| 2,888,837 | 6/1959 | Hellmann | 74—568 |

FOREIGN PATENTS

| 40,764 | 9/1909 | Austria. |
|---|---|---|

FRED C. MATTERN, JR., Primary Examiner

F. D. SHOEMAKER, Assistant Examiner

U.S. Cl. X.R.

123—90